United States Patent [19]

Kohlhammer et al.

[11] Patent Number: 5,614,049
[45] Date of Patent: Mar. 25, 1997

[54] USE OF AQUEOUS DISPERSIONS OF TWO-PHASE EMULSION GRAFT COPOLYMERS AS BINDERS FOR STIFFENING MATERIALS IN THE TEXTILE AND LEATHER INDUSTRY

[75] Inventors: Klaus Kohlhammer, Marktl; Gerhard Koegler, Hirten; Monika Schwemmer, Unterneukirchen, all of Germany

[73] Assignee: Wacker Chemie GmbH, München, Germany

[21] Appl. No.: 633,816

[22] PCT Filed: Nov. 10, 1994

[86] PCT No.: PCT/EP94/03721

§ 371 Date: Apr. 17, 1996

§ 102(e) Date: Apr. 17, 1996

[87] PCT Pub. No.: WO95/13418

PCT Pub. Date: May 18, 1995

[30] Foreign Application Priority Data

Nov. 10, 1993 [DE] Germany ............... 43 38 374.2

[51] Int. Cl.$^6$ ............... B29C 65/00; A43B 23/08; A43B 23/14; A43B 23/16

[52] U.S. Cl. ............... 156/221; 12/146 D; 36/45; 36/68; 156/273.3; 156/326; 156/327; 156/332; 156/333; 523/167

[58] Field of Search ............... 252/86, 8.57; 428/290; 156/221, 327, 326, 332, 333, 273.3; 36/45, 68; 12/146 D; 523/167

[56] References Cited

U.S. PATENT DOCUMENTS

| | | | |
|---|---|---|---|
| 4,069,602 | 1/1978 | Kremer et al. | 428/290 |
| 4,107,120 | 8/1978 | Plamondon et al. | 523/201 |
| 4,181,769 | 1/1980 | Plamondon et al. | 428/253 |
| 4,277,384 | 7/1981 | Arkens | 428/262 |
| 4,350,732 | 9/1982 | Goodwin | 428/246 |
| 4,351,875 | 9/1982 | Arkens | 428/290 |
| 4,942,086 | 7/1990 | Mudge et al. | 428/290 |
| 5,399,621 | 3/1995 | Kohlhammer | 525/263 |

FOREIGN PATENT DOCUMENTS

| | | |
|---|---|---|
| 0102414 | 1/1987 | European Pat. Off. |
| 1485579 | 3/1969 | Germany. |
| 2224967 | 12/1973 | Germany. |
| 4103389 | 8/1992 | Germany. |
| 3404701 | 4/1993 | Germany. |
| 3447920 | 5/1993 | Germany. |
| 4240744 | 6/1994 | Germany. |
| 2154859 | 9/1985 | United Kingdom. |
| 2154899 | 9/1985 | United Kingdom. |

OTHER PUBLICATIONS

English Derwent Abstract AN 92–269897 (Aug. 1992).
English Derwent Abstract AN 68–22047Q (Mar. 1969).

*Primary Examiner*—Anthony Green
*Attorney, Agent, or Firm*—Collard & Roe, P.C.

[57] ABSTRACT

Process for the stiffening of textile or leather materials, includes (a) applying an aqueous polymer dispersion to a textile structure on the basis of a woven or nonwoven fabric, or a leather material; (b) drying the textile structure or leather material; and (c) the stiffening material thus produced is deformed and glued with the textile and leather material to be stiffened, in which an aqueous dispersion of a two-phase, sealable emulsion graft copolymer having a soft phase and a hard phase is applied. The hard phase has a glass transition temperature of Tg of at least 50° C. and includes monomer units such as methyl methacrylate, styrene, diisopropyl fumarate and vinyl chloride. The soft phase has a glass transition temperature Tg of at least 30° C. lower than the Tg of the hard phase, and the soft phase has monomer units such as methyl acrylate, ethyl acrylate, isopropyl acrylate, n-butyl acrylate, t-butyl acrylate, 2-ethylhexyl acrylate, vinyl acetate, vinyl propionate, isopropenyl acetate, vinyl laurate, vinyl esters of saturated, α-branched monocarboxylic acids having 9 to 10 carbon atoms, ethylene, propylene or 1,3-butadiene.

10 Claims, No Drawings

USE OF AQUEOUS DISPERSIONS OF TWO-PHASE EMULSION GRAFT COPOLYMERS AS BINDERS FOR STIFFENING MATERIALS IN THE TEXTILE AND LEATHER INDUSTRY

The invention relates to the use of aqueous dispersions of two-phase emulsion graft copolymers as heat-and solvent-activatable binders for stiffening. materials in the textile and leather industry, in particular to their use as binders in shoe caps.

In the textile and leather industry, stiffening backings are very often used for stabilizing the corresponding end products. They are used for shaping and retaining shape. Examples here are hats and shoes. In the case of the latter, the shoe uppers are of interest above all, in particular in the regions of the shoe tips and the heels. In this branch of the industry, stiffening backings are often also called "cap materials" or "shoe caps".

A very large number of possibilities for manufacture and incorporation of appropriate shoe caps are described in the literature. Fiber backings with a thermoplastic as a binder are often used, this polymer in the end often being decisive for retaining the shape. The initially sheet-like materials, that is to say the fiber materials coated or impregnated with binder, are glued to the leather material and then brought into their final shape by means of heat treatment. Ideally, this operation is carried out in one step. According to the prior art, shoe caps are therefore glued to the leather material by the action of heat, and at the same time are brought into their final shape, which they are to retain after cooling. For the purpose of heat-activated gluing, before their shaping the shoe caps are therefore often charged with hot-melt adhesives which can be activated, for example, with microwaves (DE-A 2224967=U.S. Pat. No. 4,069,602).

The use of hot-melt adhesives is often also dispensed with by using as the fiber binder a thermoplastic which, by simultaneous application of heat and pressure, is capable of gluing the shoe caps to the leather: DE-A 4103389 (Derwent Abstract AN 92-269897) describes a process for the production of polyamide-containing shoe caps in which a hot polymer melt is applied to a textile carrier and this is glued with the leather before cooling. EP-B 0102414 (U.S. Pat. No. 4,350,732) likewise mentions shoe caps which can be glued to the shoe material only by heat or solvent activation, without further adhesives. The disadvantage of these caps is their involved and expensive multilayer structure.

Other production processes for shoe caps are claimed in DE-C 3404701 (GB-A 2154859) and DE-C 3447920 (GB-A 2154899). In this process, pulverulent polymers are sintered onto the fiber materials and the materials are further processed accordingly.

However, simple processes in which nonwovens and similar fiber materials, for example paper, woven fabric and knitted fabric, are bonded with the aid of aqueous plastics dispersions and stiffening materials for the textile and leather industry are accessible in this manner, are desirable. In such processes, such as are known, for example, from DE-A 1485579 (Derwent Abstract AN 68-22047) for the production of shoe caps by means of aqueous polymer dispersions, the fiber materials are immersed in the polymer dispersion and dried and the coated fiber materials are initially dissolved by dipping in a solvent before gluing to the substrate, for example shoe upper leather. To improve the adhesiveness, the doctrine in DE-A 1485579 is to employ the plastics dispersion as a mixture with a polymer powder which can easily be initially dissolved. A disadvantage is that the system mentioned in this publication is a two-component system and must be stirred in an extra step before application.

The object was therefore to provide a binder for stiffening materials which is based on aqueous plastics dispersions, in which context it should be possible for the textile carrier materials coated or impregnated therewith to be glued to a substrate not only after initial dissolving with solvent but also after heat treatment. The stiffening materials furthermore should impart to the end product a permanent, shape, hard handle and good edge seam strength. To protect the upper material, the binder should be sealable (heat-activatable) at the lowest possible temperature; that is to say, the sealing temperature should be 80° C. At the same time, however, the binder should have the highest possible blocking temperature; that is to say should be resistant to blocking up to about 40° C.

Surprisingly, it has been possible to obtain this profile of requirements, which is contradictory per se—high blocking temperature coupled with a low sealing temperature—by using a two-phase graft copolymer present in an aqueous dispersion.

EP-A 358007 relates to a process for the preparation of heat-resistant nonwovens, in which the nonwoven fibre materials are coated with a crosslinkable graft copolymer. The use of graft copolymers as heat- and solvent-activatable binders for stiffening materials in the textile and leather industry is not described.

FR-A 2355038 relates to graft copolymers having a crosslinked core with an extremely high content of crosslinking agent, and a crosslinked shell having an extremely high content of crosslinking agent. The graft copolymers are described as binders and coating compositions for textiles. The use of graft copolymers for the preparation of stiffening materials which themselves are sealable at relatively low temperature by heat activation or solvent activation, and which have the required blocking resistance even without crosslinking, is neither described nor suggested.

The subject-matter of EP-A 0009258 corresponds substantially to that of FR-A-2355038: latices of graft copolymers having a high content of crosslinking agent in the core and a high content of crosslinking agent in the shell. The latices are described as coating compositions for textiles and leather. Owing to the high content of crosslinking agent, these polymers are unsuitable for use as sealable binders.

The abstract of JP-A-54/137031 relates to graft copolymers having a soft core and a hard shell, for use as adhesives for a wide variety of materials. The use of graft copolymers as heat- and solvent-activatable binders for stiffening materials in the textile and leather industry is neither described nor suggested.

The invention relates to the use of aqueous dispersions of two-phase, sealable emulsion graft copolymers having a soft phase and a hard phase, the glass transition temperature $T_g$ of the hard phase being above 50° C. and the glass transition temperatures $T_g$ of the two phases differing by at least 30° C., wherein the aqueous dispersions of the graft copolymers are used as heat- and solvent-activatable binders for stiffening materials in the textile and leather industry, a) the aqueous dispersions being applied to the textile structures to be stiffened, b) the textile structures then being dried, and c) the stiffening material thus produced being deformed and glued with other materials, such as fabric or leather.

The phase of low $T_g$ comprises one or more homo- or copolymers obtainable by emulsion polymerization of one or more monomers from the group consisting of acrylic acid esters of alcohols having 1 to 10 C atoms, vinyl esters of saturated aliphatic carboxylic acids having 2 to 10 C atoms and olefins. The phase of high $T_g$ comprises one or more monomer units from the group consisting of methacrylic acid esters of alcohols having 1 to 10 C atoms, vinyl aromatics, fumaric acid esters or maleic acid esters and vinyl halides.

Aqueous polymer dispersions having a solids content of 30 to 65% by weight are preferably used, the graft copolymer being composed of a soft core having a glass transition temperature $T_g$ of −10° to +50° C. and a hard shell having a glass transition temperature $T_g$ of $\geq$60° C. the difference between the $T_g$ values being at least 30° C. Monomers which are preferred for polymerization of the core are chosen from the acrylic acid ester group consisting of methyl acrylate, ethyl acrylate, isopropyl acrylate, n-butyl acrylate, t-butyl acrylate and 2-ethylhexyl acrylate; from the vinyl ester group consisting of vinyl acetate, vinyl propionate, isopropenyl acetate, vinyl laurate and the vinyl esters of saturated, α-branched monocarboxylic acids having 9 or 10 C atoms, such as VeoVa9$^R$ or VeoVa10$^R$; and from the olefin group consisting of ethylene, propylene and 1,3-butadiene. Preferred monomer units for the hard shell are methyl methacrylate, styrene, diisopropyl fumarate and/or vinyl chloride.

Aqueous polymer dispersions having a solids content of 45 to 65% by weight are particularly preferred, the graft copolymer comprising a soft phase having a $T_g$ of +10° to +45° C. and a hard phase having a $T_g$ of $\geq$70° C. the difference between the $T_g$ values of the soft phase and hard phase being at least 30°°C. Particularly preferred soft phases comprise vinyl acetate homopolymers, copolymers of vinyl acetate comprising VeoVa10$^R$ and/or vinyl laurate, vinyl acetate/ethylene copolymers having a vinyl acetate content of 60 to 90% by weight, and n-butyl acrylate polymers. In the particularly preferred embodiment, styrene, vinyl chloride and/or methyl methacrylate are grafted onto the soft phase.

If appropriate, the soft phase and the hard phase respectively of the emulsion graft copolymers mentioned can also comprise up to 10% by weight, based on the copolymer, of ethylenically unsaturated functional comonomers. Examples of these are mono- or dicarboxylic acids, such as methacrylic acid, acrylic acid or fumaric acid, and amides thereof, hydroxy-functional monomers, such as hydroxyethyl acrylate, 2-hydroxypropyl acrylate or N-methyiolacrylamide, sulfonate-functional monomers, such as vinyl sulfonate or 2-acrylamido-2-methyl-propanesulfonate, and polyunsaturated monomers, such as divinyl adipate.

The core/shell emulsion copolymers mentioned can in principle be prepared in any desired ratios of amounts, that is to say the proportions by weight between the hard and soft phase can be between 1:99 and 99:1. Emulsion graft copoiymers having a soft/hard ratio of 95:5 to 50:50 are preferred.

The aqueous dispersions of the two-phase emulsion graft copolymers mentioned can be used as binders by themselves or as a mixture of two or more aqueous dispersions of two-phase emulsion graft copolymers of different composition.

The preparation of the dispersions to be used according to the invention of two-phase graft copolymers is carried out by the process of emulsion.polymerization in an open reaction vessel or under pressure in two stages. The graft base, the soft core, is prepared in the first stage. This preparation can be carried out by the batch and/or feed process. After complete polymerization, the residual monomer content should be less than 1.0%, the hard shell is polymerized on in a second polymerization stage. This second stage can in principle also be carried out by the batch and/or feed process. It is preferably carried out by the feed process, the monomers and/or other constituents of the reaction mixture being at least partly metered in. The metering variant is particularly preferred for the second reaction stage, the grafting on of the polymer shell.

The two reaction stages can be carried out in a one-pot or two-pot process as desired. In the former case, the soft polymer core is first produced in a reaction vessel, and the monomers for producing the hard shell are subsequently metered in and polymerized on. In the two-pot process, the emulsion polymer of the first stage is isolated explicitly and initially introduced into a second reaction vessel as the seed latex for grafting on the hard shell. If the polymerization in the first stage is carried out under pressure, for example in the case of preparation of ethylene/vinyl acetate copolymers, the two-pot variant is preferred. For this, the polymer from the first stage is removed from the pressure autoclave and initially introduced into another reaction vessel, and the grafting monomer phase is then grafted on in the second reaction stage.

The emulsion polymerization in the first stage is initiated by agents which form free radicals, in a temperature range of 0° to 90° C. by means of water-soluble agents which form free radicals, which are preferably employed in amounts of 0.01 to 3.0% by weight, based on the total weight of the monomers. Examples of these are ammonium and potassium persulfate and peroxodisulfate; hydrogen peroxide; and azo compounds, such as azobisisobutyronitrile or azobiscyanovaleric acid. In the case of initiation by heat, the polymerization is preferably carried out at between 70° and 90° C. The formation of free radicals can be accelerated at lower temperatures, preferably 30° to 55° C., with the aid of reducing agents, such as alkali metal formaldehyde-sulfoxylates, alkali metal sulfites, bisulfites and thiosulfates and ascorbic acid.

Dispersing agents which can be employed are all the customary anionic and nonionic emulsifiers used in emulsion polymerization. Preferably, 1 to 6% by weight, based on the total weight of the monomers, of emulsifier is employed. Examples of suitable emulsifiers are anionic surfactants, such as alkyl sulfates having a chain length 25 of 8 to 18 C atoms, alkyl and alkylaryl ether-sulfates having 8 to 18 C atoms in the hydrophobic radical and up to 40 ethylene oxide or propylene oxide units, alkyl- or alkylarylsulfonates having 8 to 18 C atoms and esters and half-esters of sulfosuccinic acid with monohydric alcohols or alkylphenols. Examples of suitable nonionic surfactants are aikyl polyglycol ethers or alkylaryl polyglycol ethers having 8 to 40 ethylene oxide units.

The pH range desired for the polymerization, which is in general between 2.5 and 10, preferably 3 and 8, can-be established in a known manner by acids, bases or customary buffer salts, such as alkali metal phosphates or alkali metal carbonates. The regulators usually used for establishing the molecular weight, for example mercaptans, aldehydes and chlorohydrocarbons, can be added during the polymerization.

In a preferred procedure for the preparation of a latex of the copolymers comprising ethylene and vinyl acetate which are mentioned as particularly preferred, an ethylene pressure of 10 to 90 bar absolute is established at the start of the polymerization and is kept constant by injecting further ethylene.

The hard phase is likewise grafted on by the emulsion polymerization process. Grafting is preferably carried out at temperatures of between 30° and 90° C., depending on the initiator system chosen. Examples of free radical initiators which are suitable for initiating the grafting reaction are the water-soluble agents which form free radicals and redox initiator systems already mentioned above, in the abovementioned amounts.

If appropriate, 5.0% by weight, based on the total weight of the graft copolymer, of the nonionic or anionic emulsifiers mentioned can also be added for the grafting. In a preferred embodiment, when the addition of grafting monomer has ended, reducing agent is subsequently metered in until the residual monomer content is less than 1% by weight, based on the total weight of the latex. Grafting in the presence of a latex pretreated with hydrogen peroxide, in accordance with the procedure described in DE-A 4240744, is also preferred.

The aqueous dispersions mentioned of two-phase graft copolymers are used according to the invention for stiffening woven or nonwoven, sheet-like textile structures, such as nonwovens, nonwovens reinforced with woven fabric or fiberwoven fabric, woven fabric, tangled fabric or knitted fabric of customary naturally occurring or synthetic fibers, such as polyester, polyamides, wool, cotton, cellulose, viscose or polypropylene. During use, they are applied in the customary manner, by dipping, padding or brushing, to the material to be stiffened.

If appropriate, the additives customary for this use, such as fillers, pigments, flameproofing agents, foam-forming auxiliaries, foam inhibitors and wetting agents, can also be added in the customary amounts to the aqueous dispersions of the two-phase emulsion graft copolymers. In general, the dispersions are applied in an amount of 50 to 500 g/m$^2$, based on the dry binder, to the textile structures to be stiffened. The bound structures are in general dried at temperatures of 80° C. to 200° C., if appropriate after removal of excess binder, for example by squeezing off.

A dimensionally stable, flexible, non-brittle stiffening material having a hard handle which can be deformed as a result of the action of heat and develops tacky properties is obtained by this procedure. This stiffening material can be deformed and glued with other soft, limp materials, such as fabric or leather, under the action of heat and pressure, preferably already at a temperature of 60° to 100° C. After gluing to the stiffening material, the desired dimensional stability is imparted to the end product, for example shoes or hats.

In addition to the preferred heat-activated gluing of the stiffening material to the particular substrate, the stiffening materials finished with the two-phase graft copolymers to be used according to the invention can also be glued to the particular substrate after initial dissolving with a solvent. For this, the stiffening materials are immersed for a short time, usually up to 10 seconds, in a solvent bath and, after an open time of 0.5 to 5 minutes, are glued to the material to be stiffened by application of pressure, if appropriate with deformation. Suitable solvents are organic solvents, such as the dichloromethane or formaldehyde dimethyl acetal used in the examples.

The binders to be used according to the invention allow the production of stiffening materials which can be glued to leather materials without the usual reactive hot-melt adhesives corresponding to the prior art. They are therefore particularly suitable for the production of stiffening materials which are employed as shoe caps in the production of shoes.

The two-phase structure of the binder has a particularly advantageous effect in the use according to the invention: because of the two-phase structure, the binder can be activated either by heat or by solvents. The dispersion forms a film at a low temperature and can be sealed at a relatively low temperature without a blocking effect occurring at room temperature in the stiffening materials coated with the dispersion. The dispersed polymer functions both as a binder for the stiffening material and as an adhesive for gluing to the substrate to be stiffened.

The following examples serve to further illustrate the invention:

EXAMPLE 1

Preparation of an aqueous polyvinyl acetate dispersion as the graft base (soft phase):

4 metering solutions were first prepared:
1. Initiator solution I:
   0.32 part by weight of potassium persulfate was dissolved in 18.0 parts by weight of water.
2. Initiator solution II:
   0.136 part by weight of the Na salt of hydroxymethanesulfinic acid (Brüggolit) was dissolved in 10 parts by weight of water.
3. Monomer:
   95 parts by weight of vinyl acetate were made available.
4. Emulsifiers:
   0.35 part by weight of vinyl sulfonate, 1.7 parts by weight of a polyglycol ether of isotridecyl alcohol having 15 ethylene oxide units and 0.6 part by weight of a di-sodium (ethoxyalkyl)-sulfosuccinate were emulsified in 10 parts by weight of water.

0.4 part by weight of Na acetate, 0.001 part by weight of iron(II) ammonium sulfate, 0.5 part by weight of a polyglycol ether of isotridecyl alcohol having 15 ethylene oxide units, 0.2 part by weight of a di-sodium (ethoxyalkyl)-sulfosuccinate, 0.08 part by weight of potassium persulfate and 5.0 parts by weight of vinyl acetate were initially introduced into 47.9 parts by weight of water in a stirred tank with a reflux condenser and internal thermometer and the mixture was heated to 40° C., while stirring. When temperature equilibrium had been reached, the two initiator solutions were started at the same time, the metering rates being adjusted to correspond to a metering time of about 6 hours. Immediately after the first exothermic reaction had subsided (formation of seed latex), the monomer and emulsifier metering were started, in the course of 4 hours. After the end of metering of the monomer and emulsifier solution, the polymerization was brought to completion by further addition of initiator at 40° C.

A speck-free 51.8% strength polymer dispersion having an average particle size of 210 nm resulted. The K value (measured in tetrahydrofuran, solution: clear) of the polymer resin was 68.2 and the glass transition temperature (DSC) was $T_g = 37.6°$ C.

EXAMPLE 2

Preparation of an aqueous ethylene/vinyl acetate dispersion as the graft base (soft phase):

3 metering solutions were first prepared:
1. Initiator solution:
   0.7 part by weight of potassium persulfate was dissolved in 20.1 parts by weight of water.

2. Feed 1:
   87.5 parts by weight of vinyl acetate were made available.
3. Feed 2:
   2,40 parts by weight of di-sodium dihexylsulfosuccinate, 0.8 part by weight of acrylamido-2-methylpropanesulfonic acid (Na salt), 0.75 part by weight of acrylamide and 1.5 parts by weight of acrylic acid were dissolved in 32 parts by weight of water.

0.25 part by weight of vinyl sulfonate, 0.46 part by weight of di-sodium dihexylsulfosuccinate and 9.75 part by weight of vinyl acetate were initially introduced into 50.4 parts by weight of water in a pressure autoclave with an internal thermometer and the mixture was heated to 75° C., while stirring. When temperature equilibrium had been reached, 30 bar of ethylene were forced in, 20% of the initiator solution prepared was metered in over a period of 10 minutes and the metering rate of the remaining initiator solution was adjusted to correspond to a metering time of about 7 hours. Immediately after the first exothermic reaction had subsided (formation of the seed latex), the monomer (feed 1) and emulsifier metering (feed 2) were introduced, in the course of 6 hours. After the end of metering of the monomer and emulsifier solution, the polymerization was brought to completion by further addition of initiator at 75° C.

A speck-free 44.1% strength polymer dispersion having an average particle size of 280 nm and an ethylene content of about 15% resulted. The K value (measured in tetrahydrofuran, solution: clear) of the polymer resin was 65.2 and the glass transition temperature (DSC) was $T_g=14.9°$ C.

EXAMPLE 3

Grafting polymerization onto the graft base from Example 1:
3 metering solutions were first prepared:
1. Initiator solution I:
   0.14 part by weight of potassium persulfate was dissolved in 7.2 parts by weight of water.
2. Initiator solution II:
   0.05 part by weight of the Na salt of hydroxymethanesulfinic acid (Brüggolit) was dissolved in 2.5 parts by weight of water.
3. Pre-emulsion:
   9.75 parts by weight of styrene, 0.25 part by weight of acrylic acid and 0.2 part by weight of disodium dihexylsulfosuccinate were emulsified in 5 parts by weight of water.

173.7 parts by weight of the 51.8% strength polyvinyl acetate dispersion from Example 1 were initially introduced into a stirred tank with a reflux condenser, stirrer and internal thermometer and were heated to 40° C. When temperature equilibrium had been reached, the three metering solutions prepared were metered in over a period of 2 hours. The reaction was brought to completion by stirring at 40° C. for one hour A speck-free dispersion having a solids content of 50.1% by weight and a monomodal particle size distribution, the average particle size being about 210 nm, resulted. The particulate graft polymer was a two-phase polymer, the glass transition temperatures (DSC) were $T_g=+37.2°$ C. and $T_g=+101.8°$ C., and the K value (measured in tetrahydrofuran, solution: clear) was 66.3. The residual monomer content was determined as 0.46% and the MFT as 22° C.

EXAMPLE 4

Grafting polymerization onto the graft base from Example 2:
1070 g of the ethylene/vinyl acetate dispersion from Example 2, 61.6 g of a 35% strength $H_2O_2$ solution and 2.08 g of potassium persulfate were initially introduced into a 3 l glass flask with an internal thermometer, reflux condenser and stirrer, and the mixture was stirred at room temperature for 2 hours. It was then heated to 65° C. When temperature equilibrium had been reached, 1.65 g of the sodium salt of hydroxymethanesulfinic acid (Brüggolit), dissolved in 108 ml of water, and a pre-emulsion comprising 180 g of styrene, 2.88 g of Aerosol MA and 125 ml of water were metered in over a period of 3 hours. The reaction was brought to completion by stirring at 65° C. for one hour.

A dispersion having a solids content of 45.3% by weight and a monomodal particle size distribution, the average particle size being 302 nm, resulted. The particulate graft polymer was a two-phase polymer, the glass transition temperatures (DSC) were $T_g=+15.2°$ C. and $T_g+102.3°$ C., and the K value (measured in tetrahydrofuran, solution: clear) was 57.6. The residual monomer content was determined as 0.50%.

EXAMPLE 5

Preparation of a mixture of dispersions of two-phase graft copolymers:
The dispersions from Example 3 and Example 4 were mixed with one another in a weight ratio of 2:1.
Testing of use properties:
Production of the stiffening materials:
   The dispersions from Examples 3, 4 and 5 were used for stiffening polyester spunbonded nonwovens having a weight per unit area of 150 g/m². The binder was applied by means of full bath impregnation and subsequent squeezing off in a padder. The amount applied was 350 to 400 g/m² of dry binder. Drying was carried out over 5 minutes at 140° C. in a Matthis dryer.
Test methods:
   The hardness (rigidity) of the finished spun-bonded nonwoven was evaluated qualitatively at room temperature with the ratings 1 (=high hardness) to rating 6(=soft handle).
   The heat sealability (heat activation) of the finished spunbonded nonwoven was tested at a mold temperature of T=60° C., 70° C., 80° C. and 100° C. For this, the spunbonded nonwoven finished with the graft polymer was in each case sealed against a crude, untreated spunbonded nonwoven over an area of 1×4 cm² at the corresponding temperature and for 5 seconds under a pressure of 15 kp/cm. The seal seam strength of the composites was evaluated qualitatively according to the following scheme:
   +++=very high peeling seam strength,
   ++=high peeling seam strength,
   +=low peeling seam strength,
   0=no adhesion.

To test the solvent activation, the spunbonded nonwovens finished with graft polymer were dipped in dichloromethane (D) or formaldehyde dimethylacetal (F) over a dipping time of 0.5 second. After an open time of 1 minute, the spunbonded nonwovens thus treated were glued to crude, untreated spunbonded nonwoven over an area of 1×4 cm² at room temperature and for 5 seconds under a pressure of 15 kp/cm.

The sealing seam strength was evaluated qualitatively with the same rating scheme as for the heat activation.

The results of the testing of the use properties are summarized in Table 1:

TABLE 1

| Example | Sealing temperatures | | | | Hardness (rating) | Solvent | |
|---|---|---|---|---|---|---|---|
| | 60° C. | 70° C. | 80° C. | 100° C. | | D | F |
| 3 | 0 | 0 | + | +++ | 1 | ++ | ++ |
| 4 | + | + | ++ | +++ | 4 | ++ | ++ |
| 5 | + | + | ++ | +++ | 1 | ++ | ++ |

We claim:

1. Process for the stiffening of a material selected from the group consisting of a textile and a leather, comprising the steps of:
   a) applying an aqueous polymer dispersion to a textile structure selected from the group consisting of a woven fabric and a nonwoven fabric;
   b) drying the textile structure to produce a binder stiffening agent material;
   c) deforming and gluing the binder stiffening agent material thus produced to the said textile or leather material to be stiffened;
   (d) said aqueous polymer dispersion comprising a two-phase, sealable emulsion graft copolymer having a soft phase and a hard phase;
   wherein said hard phase has a glass transition temperature Tg of at least 50° C. and comprises monomer units selected from the group consisting of methyl methacrylate, styrene, diisopropyl fumarate and vinyl chloride; and
   wherein said soft phase has a glass transition temperature Tg of at least 30° C. lower than the Tg of the hard phase and the soft phase comprises monomer units selected from the group consisting of methyl acrylate, ethyl acrylate, isopropyl acrylate, n-butyl acrylate, t-butyl acrylate, 2-ethylhexyl acrylate, vinyl acetate, vinyl propionate, isopropenyl acetate, vinyl laurate, vinyl esters of saturated, α-branched monocarboxylic acids having 9 to 10 carbon atoms, ethylene, propylene and 1,3-butadiene.

2. The process as claimed in claim 1,
   wherein said binder comprises an aqueous polymer dispersion having a solids content of 46% to 65% by weight;
   said graft copolymer having a soft phase having a Tg of +10° C. to +45° C. and a hard phase having a Tg of ≧70° C. and the difference between the Tg values of the soft phase and the hard phase being at least 30° C.; and
   the soft phase is selected from the group consisting of vinyl acetate homopolymer, vinyl acetate/ethylene copolymer having a vinyl acetate content of 60% to 90% by weight, and n-butyl acrylate polymer; and the hard phase is selected from the group consisting of styrene, vinyl chloride, methyl methacrylate and the mixtures thereof grafted as the hard phase onto the soft phase.

3. The process as claimed in claim 1,
   wherein the weight ratio of soft phase to hard phase is 95:5 to 50:50.

4. The process as claimed in claim 1,
   wherein the aqueous dispersion of the two-phase emulsion graft copolymer is selected from a binder or a binder mixture of at least two aqueous dispersions of two-phase emulsion graft copolymers of different composition.

5. The process as claimed in claim 1, comprising stiffening leather material for the production of shoes.

6. Process for the stiffening of a material selected from the group consisting of a textile and a leather, comprising the steps of:
   a) applying an aqueous polymer dispersion to a textile structure selected from the group consisting of a woven fabric and a nonwoven fabric;
   b) drying the textile structure to produce a binder stiffening agent material;
   c) deforming and gluing the binder stiffening agent material thus produced to the said textile or leather material to be stiffened, under the action of heat and pressure at a temperature of 60° C. to 100° C.;
   (d) said aqueous polymer dispersion comprising a two-phase, sealable emulsion graft copolymer having a soft phase and a hard phase; and
   wherein said hard phase has a glass transition temperature Tg of at least 50° C. and comprises monomer units selected from the group consisting of methyl methacrylate, styrene, diisopropyl fumarate and vinyl chloride; and
   wherein said soft phase has a glass transition temperature Tg of at least 30° C. lower than the Tg of the hard phase and the soft phase comprises monomer units selected from the group consisting of methyl acrylate, ethyl acrylate, isopropyl acrylate, n-butyl acrylate, t-butyl acrylate, 2-ethylhexyl acrylate, vinyl acetate, vinyl propionate, isopropenyl acetate, vinyl laurate, vinyl esters of saturated, α-branched monocarboxylic acids having 9 to 10 carbon atoms, ethylene, propylene and 1,3-butadiene.

7. The process as claimed in claim 6,
   wherein said binder comprises an aqueous polymer dispersion having a solids content of 46% to 65% by weight; and
   said graft copolymer having a soft phase having a Tg of +10° C. to +45° C. and a hard phase having a Tg of ≧70° C. and the difference between the Tg values of the soft phase and the hard phase being at least 30° C.; and
   the soft phase is selected from the group consisting of vinyl acetate homopolymer, vinyl acetate/ethylene copolymer having a vinyl acetate content of 60% to 90% by weight and n-butyl acrylate polymer; and
   the hard phase is selected from the group consisting of styrene, vinyl chloride, methyl methacrylate, and the mixtures thereof grafted as the hard phase onto the soft phase.

8. The process as claimed in claim 7,
   wherein the weight ratio of soft phase to hard phase is 95:5 to 50:50.

9. The process as claimed in claim 6, wherein the aqueous dispersion of the two-phase emulsion graft copolymer is selected from a binder or a binder mixture of at least two aqueous dispersions of two-phase emulsion graft copolymers of different composition.

10. The process as claimed in claim 6, comprising stiffening leather material for the production of shoes.

* * * * *